United States Patent [19]
Kanemaru et al.

[11] 3,872,032
[45] Mar. 18, 1975

[54] PROCESS FOR THE PREPARATION OF GRAPHITE FLUORIDE

[75] Inventors: Toyonosuke Kanemaru, Yokohama; Toshio Shimada, Maebashi; Isao Inudow, Shibukawa, all of Japan

[73] Assignee: Nippon Carbon Co. Ltd., Tokyo, Japan

[22] Filed: Feb. 8, 1973

[21] Appl. No.: 330,876

[30]     Foreign Application Priority Data
     Feb. 14, 1972   Japan.................................. 47-15405

[52] U.S. Cl............... 260/2 H, 260/653.1, 423/439, 423/489
[51] Int. Cl. ........................ C08b 31/00, C08b 7/00
[58] Field of Search............. 260/2 R, 2 H; 423/489, 423/439

[56]     References Cited
     UNITED STATES PATENTS
3,397,087   8/1968   Yoshizama et al. ................ 260/2 H OTHER PUBLICATIONS
Watanabe et al., "Studies on The Preparation of F and Its Compounds VIII;" J. Electrochem Soc. Jap. Vol. 32 No. 1, (1964), pp. 17–25.

*Primary Examiner*—Wilbert J. Briggs, Sr.
*Attorney, Agent, or Firm*—Frank J. Jordan

[57]     ABSTRACT

A process for the preparation of a white-colored graphite fluoride by reacting carbon with a fluorine material containing not more than 5% by volume of hydrogen fluoride.

6 Claims, 1 Drawing Figure

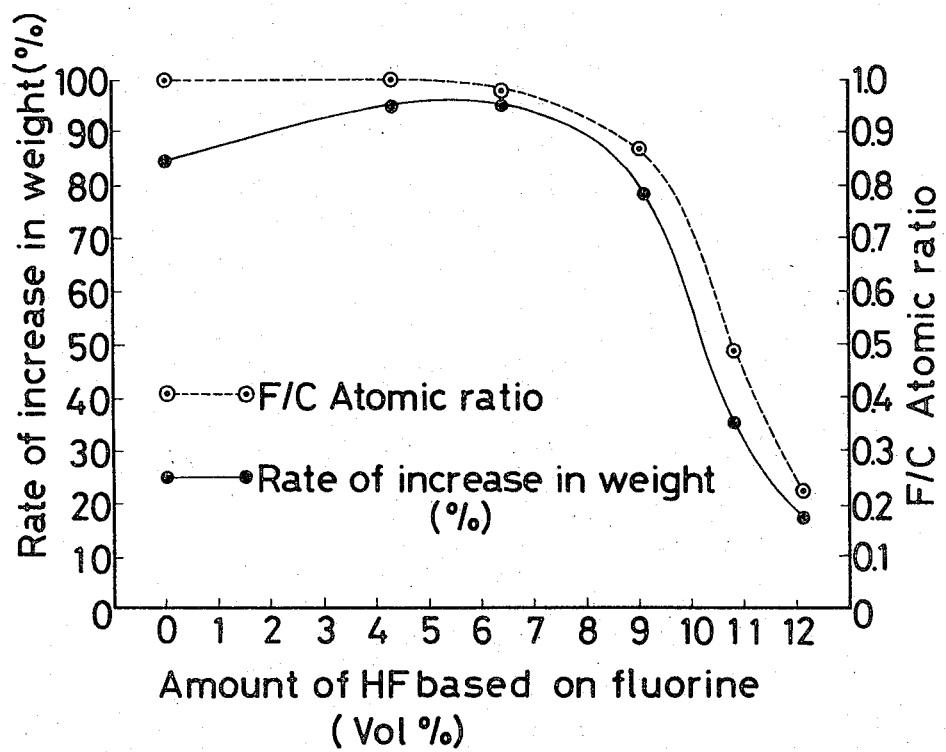

PROCESS FOR THE PREPARATION OF GRAPHITE FLUORIDE

The present invention relates to a process for preparing carbon fluoride and more particularly to a process for preparing a white-colored graphite fluoride wherein the carbon and fluorine are contained in the atomic ratio of 1:1 by reacting carbon with a fluorine material consisting essentially of fluorine and hydrogen fluoride, the hydrogen fluoride being present in amounts of not more than approximately 5% by volume of the fluorine.

With respect to the effect of hydrogen fluoride (hereinafter referred to as "HF") on a reaction for producing graphite fluorides, Rūdorff et al. have reported that HF is effective in promoting the formation of graphite fluorides in view of the fact that graphite fluorides in the filmy state are produced on graphite anodes in a KF-2HF type molten salt electrolysing system. For example, flake graphite will not increase in weight (weight increase, 0%) if the graphite is contacted with fluorine containing no HF (HF partial pressure, OmmHg) at 270°C, whereas the increase of the flake graphite in weight will amount to 7.2–8.2% by weight of the graphite if the fluorine contains HF in amounts of 26–33% by volume thereof (HF partial pressure, 200–250 mmHg) in the above case. Further, the increase in weight will amount to 5.3% if the fluorine contains no HF (the partial pressure of the HF in the fluorine being OmmHg) and the reaction temperature used is 440°C, and this increase rate of 5.3% is lower than that obtained at 270°C with fluorine wherein the HF is present at a partial pressure of 200–250 mmHg as mentioned above. From the foregoing it has been found that the course of reactions between flake graphite and fluorine depends more upon the concentration of HF than upon the temperature of reaction and, based on this finding, it has been reported that the HF has a favorable effect on promoting the fluorinating reaction. Rudorff et al. have further reported that the course of a reaction between a HF-containing fluorine and microcrystalline carbon such as a coke oven graphite, depends rather upon the reaction temperature than the HF concentration, and that the HF has little effects on the formation of graphite fluorides. It is thus known that such HF is catalytically effective or hardly effective in the reaction between crystalline carbon and fluorine containing such HF. In the production of graphite fluorides (hereinafter referred to as "CF") from non-crystalline carbon as the carbon source, only reaction temperatures have heretofore been considered important. As a result of extensive research made in reactions between non-crystalline carbon and fluorine, it has been found, by the present inventors, that the concentration of HF has a great effect on the CF-forming reaction between a non-crystalline carbon and fluorine containing HF. More particularly, it has been found, in CF production from non-crystalline carbon and HF-containing fluorine that, if the HF concentration is high the CF-forming reaction will be hindered whereby, unlike the case where crystalline carbon is used as the carbon source as reported by Rūdorff et al., CF is not easily formed, while if the HF concentration is not higher than 5% by volume of the fluorine in the HF-containing fluorine gas there will easily be produced CF which is especially featured by being white in color and having an atomic ratio of C:F of 1:1. The CF compounds of the present invention are characterized by being inorganic high molecular weight compounds having the general formula $(CF)_n$ wherein $n$ is indefinite or variable depending upon the kind of carbon material used. All percentages used herein are by volume, based on fluorine.

Generally, commercial fluorine is obtained by electrolysing a two-component (KF. 2HF) type melting salt at a temperature higher, by 25–30°C, than its solidifying temperature and the thus-obtained fluorine necessarily contains HF in amounts corresponding to its partial vapor pressure at the electrolyzing temperature. For this reason, the content of HF in the fluorine gas, which varies depending on the electrolysing temperature, may amlunt to as high as approximately 10–14% by volume. Since HF can have effects not only on the reaction between the non-crystalline carbon and fluorine but also can cause corrosion of the apparatus used for producing graphite fluorides from the carbon and the fluorine, it is advantageous that the HF content be low.

From various researches made by the present inventors into the effect of HF on the reaction of a non-crystalline carbon with the fluorine portion of fluorine containing HF, the following has been found. In a reaction between the non-crystalline carbon and fluorine gas containing more than 5% by volume of HF, diffusion of the fluorine into the carbon particles is increasingly hindered as the reaction proceeds, thereby causing a rapid lowering of the reaction velocity and consequently making impossible the production of graphite fluoride having a carbon-to-fluorine atomic ratio of 1:1. This phenomenon is gradually more apparent with an increase in concentration of the HF. This is because the HF contained in the fluorine gas permeates, attaches to, or is adsorbed on the cracks or pores present in the carbon particles thereby hindering the diffusion of the fluorine thereinto. The experimental results the present inventors have obtained show that when the fluorine gas used contained HF in such a high concentration corresponding to a partial vapor pressure of 200–250 mmHg as described in said report by Rŭdorff et al., the fluorination proceeded only to the extent that an approximate carbon-to-fluorine atomic ratio of 1:0.2–0.3 was obtained whereby a white-colored carbon fluorine having a carbon-to-fluorine atomic ratio of 1:1 could not be produced. In order to obtain such white-colored CF in a high yield, it is thus necessary to use fluorine containing HF in amounts of not more than approximately 5% by volume, the fluorine being prepared by purifying commercial fluorine so that the HF contained therein is decreased in amount to approximately 5% by volume or less. From the view-point of the yield of the product, on the other hand, the fluorine used may contain HF in certain amounts such as 1–3% by volume. This is because the HF is effective in limiting the occurrence of $CF_4$-producing reactions to a minimum as indicated by the following formulae of chemical reactions:

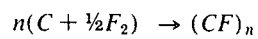

$$n(C + \tfrac{1}{2}F_2) \rightarrow (CF)_n$$

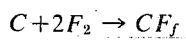

$$C + 2F_2 \rightarrow CF_f \qquad 2.$$

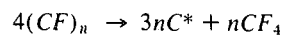

$$4(CF)_n \rightarrow 3nC^* + nCF_4$$

3.

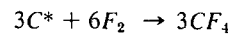

$$3C^* + 6F_2 \rightarrow 3CF_4$$

4.

(Note: C* indicates an activated carbon.)

Since the reactions as shown by the formulae (2) to (4) take place simultaneously with the occurrence of the CF-producing reaction as shown by the formula (1), the $CF_4$ (inert gas) so produced escapes from the reaction system, thereby lowering the yield of the desired graphite fluoride. In order to inhibit the production of such $CF_4$, not more than 5% by volume of HF should be contained in the fluorine. In addition, HF in such amounts as those above hardly hinders the diffusion of fluorine into the carbon particles.

In the accompanying drawing, the figure shows the fluorine-to-carbon (F/C) ratios and graphite fluoride formation rates (or carbon weight increases rates) versus the HF contents in fluorine materials used as shown in a table to be indicated later.

The CF obtained according to the present invention hardly contains HF because of its formation in the presence of fluorine gas containing HF in low concentrations and, in addition, it is a chemically stable substance. Thus the CF is advantageous in that it can be successfully used in its applications without causing corrosion and other troubles.

The fluorine used in the process of the present invention is prepared by purifying the commerical fluorine (industrially produced) to the extent that its content of HF is decreased to approximately 5% by volume or less based on the pure fluorine portion of the comerical fluorine.

The carbon materials which may be used include coke, carbon black, charcoal, sugar carbon (carbonized sugar) and any other non-crystalline carbon, and they may be of large, small or fine particle size.

The reaction temperature and time which may preferably be used herein are 300°–450°C, more preferably 350°–400°C, and ½–10 hours, more preferably 5–7 hours, respectively.

The present invention will be better understood by the following examples and comparative data or examples, wherein the fluorine used was prepared by adding a predetermined amount of HF to a substantially pure fluorine obtained by eliminating HF from an industrially produced fluorine gas containing such HF.

A fluorine material obtained by electrolysing a KH.2HF molten salt at a temperature of 105°C was passed in series through two containers 180 mm$\phi$ × 150 mm packed with sodium fluoride and then through a condenser 150 mm$\phi$ × 500 mm cooled by liquid oxygen to remove from the fluorine material substantially all of the HF contained therein thereby obtaining substantially pure fluorine. The fluorine thus obtained was confirmed by use of a Drehgel detector to contain less than 0.5 p.p.m. of HF. The fluorine was further confirmed by passing through a HF detecting glass tube (this tube being clouded when HF is present therein) to have been substantially freed of HF. Portions of the purified fluorine so obtained were each mixed with a predetermined amount of HF supplied from a Bombe (or pressure container) charged with HF, to form a mixed gas which was then used as the fluorine reactant for reaction with petroleum coke as the carbon material. The fluorine reactant and carbon material were reacted with each other in a rotary nickel-made container which was 155 mm in diameter and 240 mm in length.

Sixty grams of the carbon material having a particle size of 35–50 $\mu$ were introduced to the rotary container or reactor. The container so charged was perfectly purged with nitrogen and then a mixture of the fluorine material and nitrogen was allowed to pass therethrough so as to enable the carbon and fluorine to react with each other while the rotary reactor was rotated at a velocity of 3 r.p.m. The carbon samples so reacted with the fluorine was tested for their tint and increase in weight.

Table

| Example No. | Carbon material | Amount of carbon material used (g) | Reaction temperature (°C) | Reaction time (Hr) | Amount of fluorine used (ml/min) | Amount of nitrogen used (ml/min) | Amount of HF, based on fluorine (Vol %) | Increase in weight (%) | C : F Atomic ratio | Tint |
|---|---|---|---|---|---|---|---|---|---|---|
| Example 1 | Petroleum Coke | 60 | 380 – 390 | 7 | 230 | 200 | Trace | 85 | 1 : 1 | White |
| Example 2 | do. | do. | do. | do. | do. | do. | 4.3 | 95 | 1 : 1 | White |
| Comparative example 1 | do. | do. | do. | do. | do. | do. | 6.4 | 95 | 1 : 0.95 | White-gray |
| Comparative example 2 | do. | do. | do. | do. | do. | do. | 9.1 | 78.5 | 1 : 0.8 | Gray |
| Comparative example 3 | do. | do. | do. | do. | do. | do. | 10.8 | 35.1 | 1 : 0.5 | Black-gray |
| Comparative example 4 | do. | do. | do. | do. | do. | do. | 12.1 | 17.3 | 1 : 0.3 | Black |

From the table it is seen that the use of fluorine containing not more than 5% by volume of HF will produce CF wherein the carbon and fluorine are present in the atomic ratio of 1:1, that is, C:F = 1:1, while the use of fluorine containing more than 5% by volume of HF will not produce such CF as above and will gradually lessen the rate of increase of the carbon material in weight due to the reaction with the fluorine.

It is to be noted that the graphite fluoride obtained by the process of the present invention is superior in waterproof, oil-resistant, corrosion-resistant, water-repellent, lubricant and like properties and may therefore be used in electrolyzing plates, packing, gaskets, paper, cloths and the like to provide them with waterproof and/or water-repellent properties and also in plastics and the like to provide them with lubricant properties.

What is claimed is:

1. A process for the preparation of a white-colored, inorganic, high molecular weight graphite fluoride having a carbon-to-fluorine atomic ratio of 1:1, comprising reacting a non-crystalline carbon selected from the group consisting of coke, carbon black, charcoal and carbonized sugar with a fluorine material consisting essentially of fluorine and hydrogen fluoride, said hydrogen fluoride being present in an amount not more than 5% by volume, of said fluorine, for a sufficient time to obtain the graphite fluoride.

2. A process according to claim 1, wherein the hydrogen fluoride content is 1-3%.

3. A process according to claim 1, wherein the reaction is effected at a temperature between 300°-450°C.

4. A process according to claim 1, wherein the reaction time is ½-10 hours.

5. A process according to claim 1, wherein the reaction is effected at a temperature between 350°-400°C.

6. A process according to claim 6, wherein the reaction time is 5-7 hours.

* * * * *